US008155853B2

(12) United States Patent
Wang

(10) Patent No.: US 8,155,853 B2
(45) Date of Patent: Apr. 10, 2012

(54) MECHANICAL TIME DILATION ALGORITHM FOR COLLISION AVOIDANCE SYSTEM

(75) Inventor: Jenne-Tai Wang, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 428 days.

(21) Appl. No.: 12/466,730

(22) Filed: May 15, 2009

(65) Prior Publication Data

US 2009/0326774 A1 Dec. 31, 2009

Related U.S. Application Data

(60) Provisional application No. 61/076,041, filed on Jun. 26, 2008.

(51) Int. Cl.
*G06F 7/70* (2006.01)

(52) U.S. Cl. ............ 701/70; 701/45; 701/46; 701/300; 701/301; 280/735; 342/455

(58) Field of Classification Search ............... 701/70, 701/45–46, 48, 300–301; 280/735; 342/455, 342/29, 32, 70, 118, 149
See application file for complete search history.

(56) References Cited

U.S. PATENT DOCUMENTS

| 4,791,900 A | 12/1988 | Buck et al. |
| 6,748,307 B1 * | 6/2004 | Sala et al. .................. 701/46 |
| 6,856,906 B2 | 2/2005 | Winner et al. |
| 7,321,817 B2 * | 1/2008 | Prakah-Asante et al. ....... 701/45 |
| 2005/0131646 A1 | 6/2005 | Camus |
| 2006/0091728 A1 | 5/2006 | Fulks et al. |
| 2008/0040004 A1 | 2/2008 | Breed |

FOREIGN PATENT DOCUMENTS

WO   WO 98/32030   7/1998

* cited by examiner

*Primary Examiner* — Thomas Black
*Assistant Examiner* — Luke Huynh
(74) *Attorney, Agent, or Firm* — John A. Miller; Miller IP Group, PLC

(57) ABSTRACT

A system and method for providing mechanical time dilation by pre-braking a vehicle in the event there is a collision threat so as to reduce or eliminate the need for full automatic braking if the collision becomes imminent. The system calculates a time dilation deceleration to either maintain a time to collision at a previous value before the calculation or at a predetermined value. The system also estimates a projected closing speed of the vehicle to the object at a distance that would require full automatic braking to prevent a collision. The system then determines whether the time dilation deceleration is greater than a decelerating threshold and, if so, provides automatic vehicle braking at the threshold until the vehicle comes to a full stop. If the time dilation deceleration is not greater than the threshold, then the system provides automatic braking to decelerate the vehicle at the time dilation deceleration.

18 Claims, 15 Drawing Sheets

MECHANICAL TIME DILATION ALGORITHM FOR COLLISION AVOIDANCE SYSTEM

CROSS-REFERENCE TO RELATED APPLICATIONS

This application claims the benefit of the filing date of U.S. Provisional Application Ser. No. 61/076,041, titled Mechanical Time Dilation Algorithm for Collision Avoidance System, filed Jun. 26, 2008.

BACKGROUND OF THE INVENTION

1. Field of the Invention

This invention relates generally to a system and method for providing selective and limited pre-braking of a vehicle in the event of a potential collision with an object and, more particularly, to an algorithm that provides mechanical time dilation using limited braking to increase the time that a vehicle collision avoidance system has to determine whether it needs to intervene in the driving operation of a driver, such as to provide full automatic braking, to prevent a collision with an object.

2. Discussion of the Related Art

Vehicle manufacturers are constantly designing vehicles with improved safety features. Certain vehicles employ collision avoidance systems that provide full automatic braking of a vehicle if the system determines that a collision with an object, such as another vehicle, is imminent. Full automatic braking can be very stressful to the vehicle occupants as the vehicle comes to a rapid stop. It would be desirable to improve collision avoidance systems by limiting the need to provide full automatic braking if a collision threat is detected.

SUMMARY OF THE INVENTION

In accordance with the teachings of the present invention, a system and method are disclosed for providing mechanical time dilation by pre-braking a vehicle in the event that a collision avoidance system on the vehicle determines that there is a collision threat so as to reduce or eliminate the need for full automatic braking if the collision becomes imminent. If the collision avoidance system determines that there is a collision threat, then the system calculates a time dilation deceleration to provide limited braking to either maintain a time to collision at a previous value before the calculation or at a predetermined value. The system also estimates a projected closing speed of the vehicle to the threat at a distance that would require full automatic braking to prevent a collision. The system then determines whether the time dilation deceleration is greater than a decelerating threshold and, if so, provides automatic vehicle braking at the threshold until the vehicle comes to a full stop. If the time dilation deceleration is not greater than the deceleration threshold, then the system provides automatic braking to decelerate the vehicle at the time dilation deceleration. The projected closing speed is used to determine whether the vehicle should be decelerated to a full stop at the time dilation deceleration.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing mechanical time dilation by providing limited vehicle braking in the event of a collision threat so as to reduce the chance that full automatic braking is needed to avoid the collision is merely exemplary in nature, and is in no way intended to limit the invention or its applications or uses.

The present invention proposes an algorithm that calculates a mechanical time dilation in the event of a potential vehicle collision with an object by providing pre-braking so as to reduce the chance that full automatic braking will be needed if the collision becomes imminent.

Figure 1:
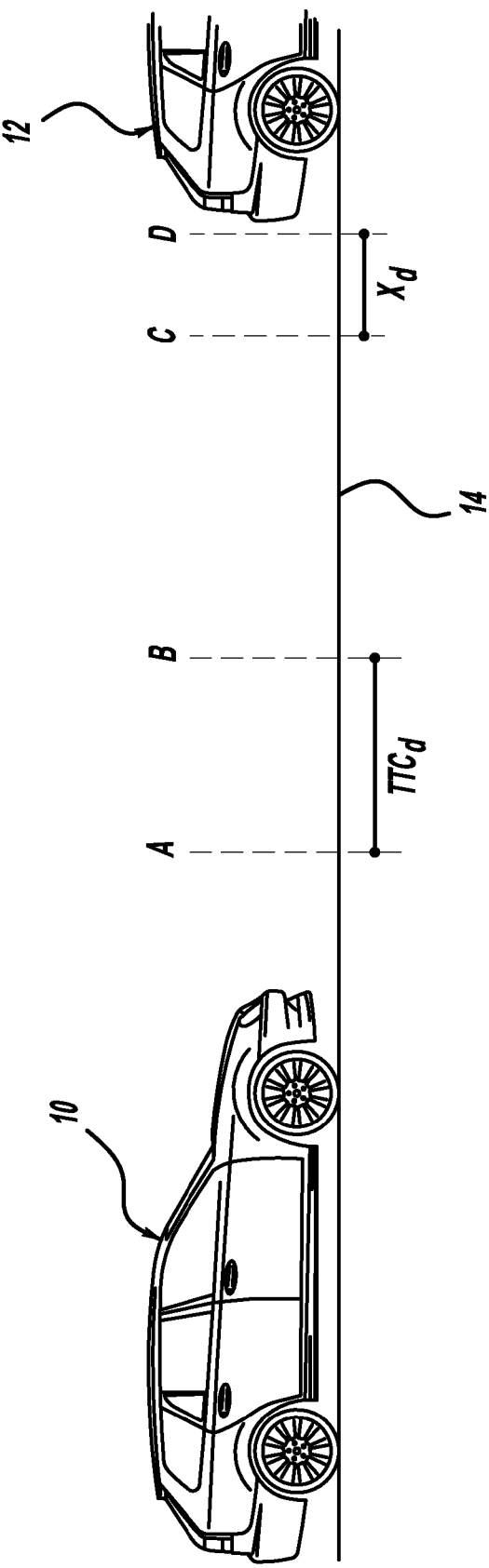
FIG. 1 is a plan view of a vehicle following another vehicle on a roadway and showing representative points where selective and full automatic braking can be employed to avoid a collision with the vehicle.

FIG. 1 is a plan view of a vehicle 10 traveling behind another vehicle 12 on a roadway 14. In certain situations, the vehicle 10 may collide with the vehicle 12 as a result of various factors. Some vehicles employ collision avoidance systems that include sensors on the vehicle 10 to detect the closing range and relative speeds of the vehicles 10 and 12, and automatically apply full braking to prevent the vehicle 10 from colliding with the vehicle 12 if a collision becomes imminent. However, such full automatic braking may be unnerving to the occupants of the vehicle 10. Thus, it would be desirable to avoid such full braking if possible.

In the illustration shown in FIG. 1, the distance $x_d$ between points C and D represents the distance of a desired safety margin where the collision avoidance system of the vehicle 10 needs to provide adequate braking to achieve a full stop at the point C to avoid colliding with the vehicle 12. According to the invention, point A represents a point to determine and activate a desired automatic braking level in order to freeze the "time to point C," and point B represents the theoretical limit of the above time freezing period and a starting point to continue the same level of braking to prolong the time to a full stop at point C, and hence, to prevent the vehicle 10 from colliding with the vehicle 12.

The required deceleration of the vehicle 10 to freeze time to arrive at point C from point A is referred to as time dilation deceleration ($TDD_j$) and can be calculated as:

$$TDD_j = \frac{2[(DTC_j - x_d) - v_j(TTC_d)]}{(TTC_d)^2} \quad (1)$$

Where $TTC_d$ is the desired time to point C from point A through point B, $v_j$ is the closing speed of the vehicle 10 to the vehicle 12, $DTC_j$ is the distance to collision at point D for time $t_j$ and $x_d$ is the required full stop range from point C to point D, which is essentially serving as a safety margin for the collision avoidance system.

It is noted that time is essentially frozen at time $t_j$ in the vehicle time frame because its time to point C ($TTC_j$) remains constant when the vehicle 10 is traveling from point A to point B as:

$$TTC_j = \frac{-v_j + \sqrt{v_j^2 + 2(TDD_j)(DTC_j - x_d)}}{TDD_j} = TTC_d = \text{constant} \quad (2)$$

According to the invention, a mechanical time dilation MTD is calculated as:

$$TTC_j = \frac{2}{(1 + v_C/v_j)} TTC'_j \quad (3)$$

Where $TTC_j'$ is the time to point C without the mechanical time dilation MTD at time $t_j$ and $v_C$ is the projected closing speed of the vehicle 10 at point C.

It is noted that when the projected closing speed $v_C$ of the vehicle 10 at point C is equal to the closing speed of the vehicle 10 relative to the vehicle 12, without deceleration, there is no mechanical time dilation MTD, i.e., $TTC_j = TTC_j'$. The lower the projected closing speed at point C due to higher deceleration, the longer it takes the vehicle 10 to arrive at point C where time is slowed down farther. The longest possible time to point C with mechanical time dilation MTD is bounded by two times the time to point C (TTC) without the mechanical time dilation MTD, when the projected closing speed at point C is zero ($v_C$=0). The above described time freezing phenomenon due to deceleration is referred to as modified mechanical time dilation MTD to highlight its similar effect as in the gravitational time dilation that time has slowed down when gravity increases.

Figure 2:
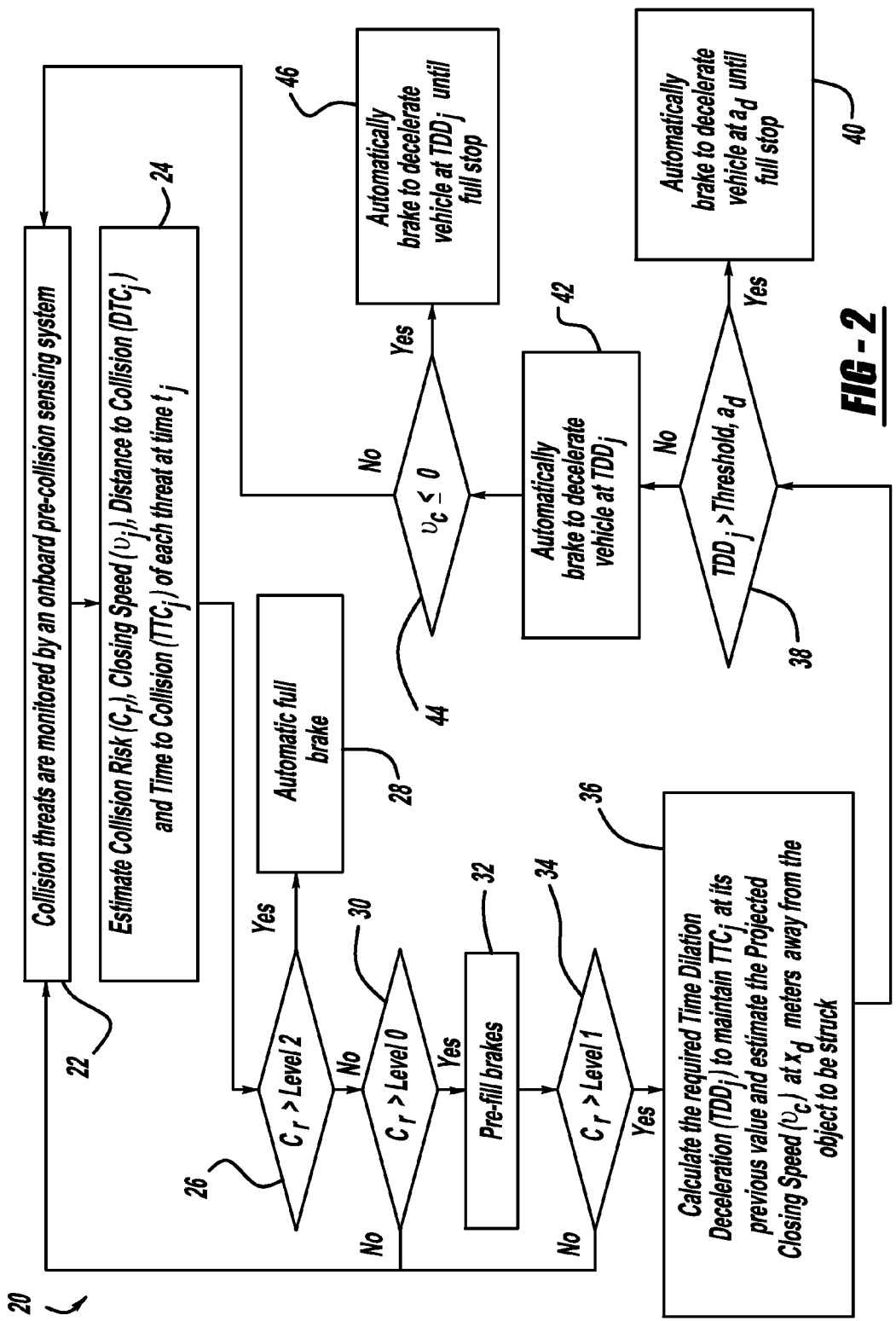
FIG. 2 is a flow chart diagram showing a process for providing mechanical time dilation through limited vehicle braking in the event that a collision threat is determined so as to provide more time to determine whether full automatic braking is required to avoid the collision, according to an embodiment of the present invention.

FIG. 2 is a flow chart diagram 20 showing a process for determining mechanical time dilation using a desired full stop range $x_d$, according to an embodiment of the present invention. In this embodiment, the desired full stop range $x_d$ is given. Point A represents an automatic brake to freeze time to point C until the projected closing speed of the vehicle 10 at point C is zero or until the vehicle 10 reaches its maximum braking force. Point B is the location where the vehicle 10 continues the same braking force level to minimize the closing speed to the vehicle 12 and to prolong the time to the point C.

At box 22, collision threats are monitored by a pre-collision sensing system on the vehicle 10. When a potential collision threat is detected, the algorithm estimates a collision risk value $C_r$, the closing speed $v_j$ between the vehicle 10 and the threat, the distance to collision $DTC_j$ between the vehicle 10 and the threat and the time to collision $TTC_j$ between the vehicle 10 and the threat at box 24. Algorithms that calculate these values are well known to those skilled in the art. The algorithm then determines whether the collision risk value $C_r$ is greater than a level 2 threshold at decision diamond 26 and, if so, provides automatic full braking at box 28 because the collision is imminent and unavoidable.

If the collision risk value $C_r$ is less than the level 2 threshold at the decision diamond 26, then the algorithm determines whether the collision risk value $C_r$ is greater than a level zero threshold, which is less than the level 2 threshold, at decision diamond 30. If the collision risk value $C_r$ is not greater than the level 0 threshold at the decision diamond 30, then the collision threat is low, and the algorithm returns to the box 22 for monitoring collision threats. If the collision risk value $C_r$ is greater than the level 0 threshold at the decision diamond 30, then the algorithm may perform certain pre-collision functions, such as pre-filling the brakes at box 32. The algorithm then determines whether the collision risk value $C_r$ is greater than a level 1 threshold that is between the level 0 threshold and the level 2 threshold at decision diamond 34 and, if not, meaning that the collision threat is too low, returns to the box 22 to monitor collision threats.

If the collision risk value $C_r$ is greater than the level 1 threshold at the decision diamond 34, then the algorithm calculates the required time dilation deceleration $TDD_j$, such as by equation (1), to maintain the desired time to point C ($TTC_j$) at its previous value just before the calculation, and estimate the projected closing speed $v_C$ of the vehicle 10 at $x_d$ meters away from the threat at box 36. The algorithm then determines whether the time dilation deceleration $TDD_j$ is greater than a predetermined maximum braking threshold $a_d$ at decision diamond 38 and, if so, provides automatic braking to decelerate the vehicle 10 at the value $a_d$ until the vehicle 10 reaches a full stop at box 40. Thus, if the required deceleration to maintain the desired time to point C at the previous value requires braking to be above a certain threshold $a_d$, then the maximum deceleration braking is provided, which is less than the full automatic braking until the vehicle 10 comes to a full stop.

If the time dilation deceleration $TDD_j$ is not greater than the threshold $a_d$ at the decision diamond 38, then the algorithm causes the vehicle 10 to automatically brake to decelerate the vehicle 10 at the time dilation deceleration $TDD_j$ at box 42. The algorithm then determined whether the projected closing speed $v_C$ is less than or equal to zero at decision diamond 44 and, if not, meaning that the vehicle 10 is closing on the vehicle 12, returns to the box 22 to re-evaluate collision threats for further actions. If the projected closing speed $v_C$ is less than or equal to zero at the decision diamond 44, then the algorithm causes the vehicle 10 to be automatically braked to decelerate the vehicle 10 at the time dilation deceleration $TDD_j$ until the vehicle 10 is at a full stop at box 46.

Figure 3:
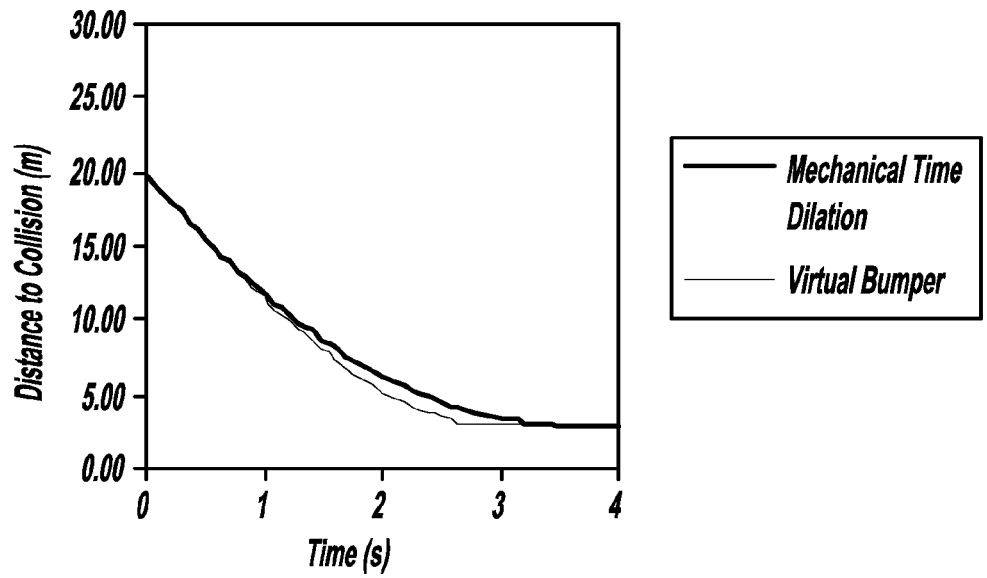
FIG. 3 is a graph with time on the horizontal axis and distance to collision on the vertical axis showing an exemplary comparison between the process for providing mechanical time dilation in response to a collision threat shown in FIG. 2 and a virtual bumper system that also employs a process for responding to a collision threat.
Figure 4:
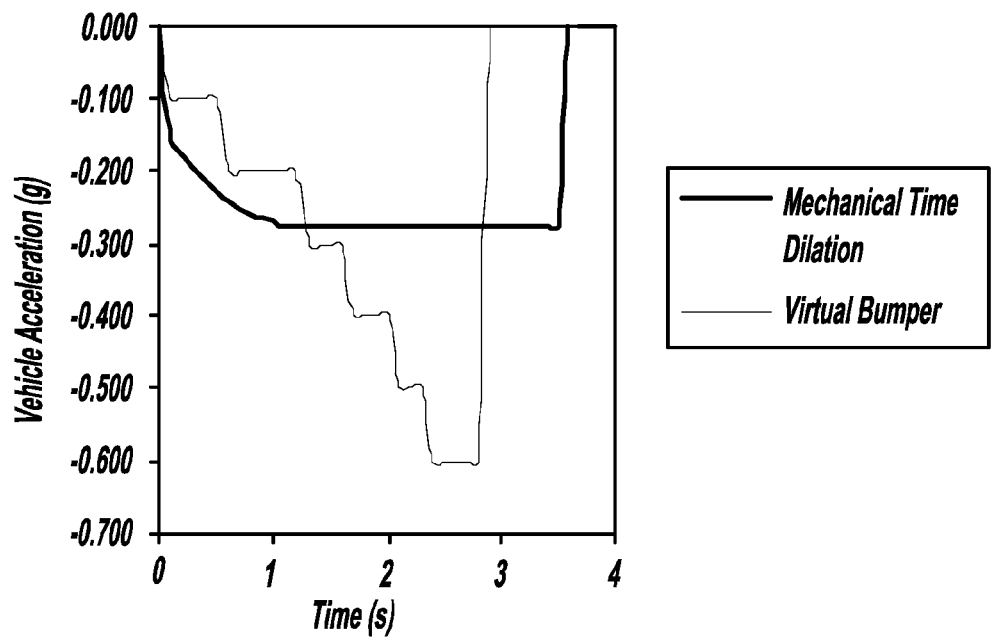
FIG. 4 is a graph with time on the horizontal axis and vehicle acceleration on the vertical axis showing an exemplary comparison between the process for providing mechanical time dilation in response to a collision threat shown in FIG. 2 and a virtual bumper system that also employs a process for responding to a collision threat.
Figure 5:
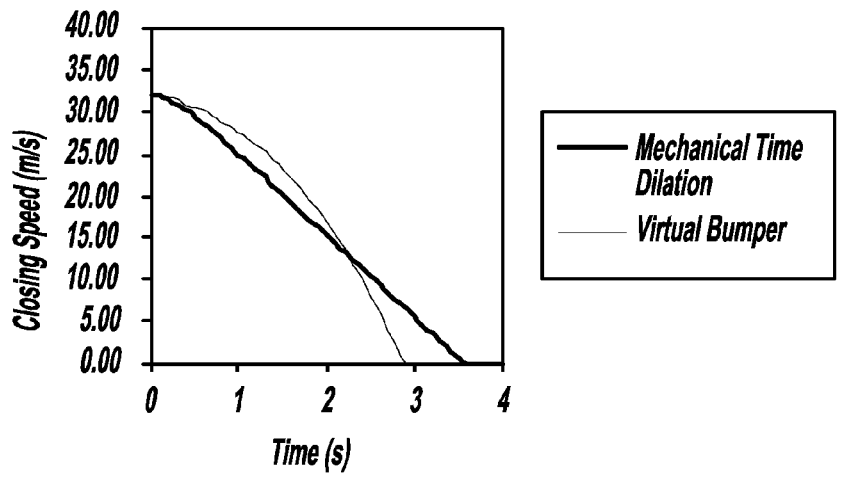
FIG. 5 is a graph with time on the horizontal axis and closing speed on the vertical axis showing an exemplary comparison between the process for providing mechanical time dilation in response to a collision threat shown in FIG. 2 and a virtual bumper system that also employs a process for responding to a collision threat.

FIGS. 3-5 are graphs showing an exemplary comparison between the process for providing mechanical time dilation in response to a collision threat shown by the flow chart diagram 20 and for a process known as virtual bumper that also responds to a collision threat. Particularly, FIG. 3 shows a comparison for distance to collision over time, FIG. 4 shows a comparison for vehicle acceleration over time and FIG. 5 shows a comparison between closing speed over time. In this example, the closing speed is 32 kph and the range is 20 m as initial conditions, where the mechanical time dilation strategy is to provide a freeze TTC at 2.25 seconds and a full stop range of 3 m. The mechanical time dilation results included a maximum acceleration of −0.28 g and a time to full stop of 3.6 seconds.

Figure 6:
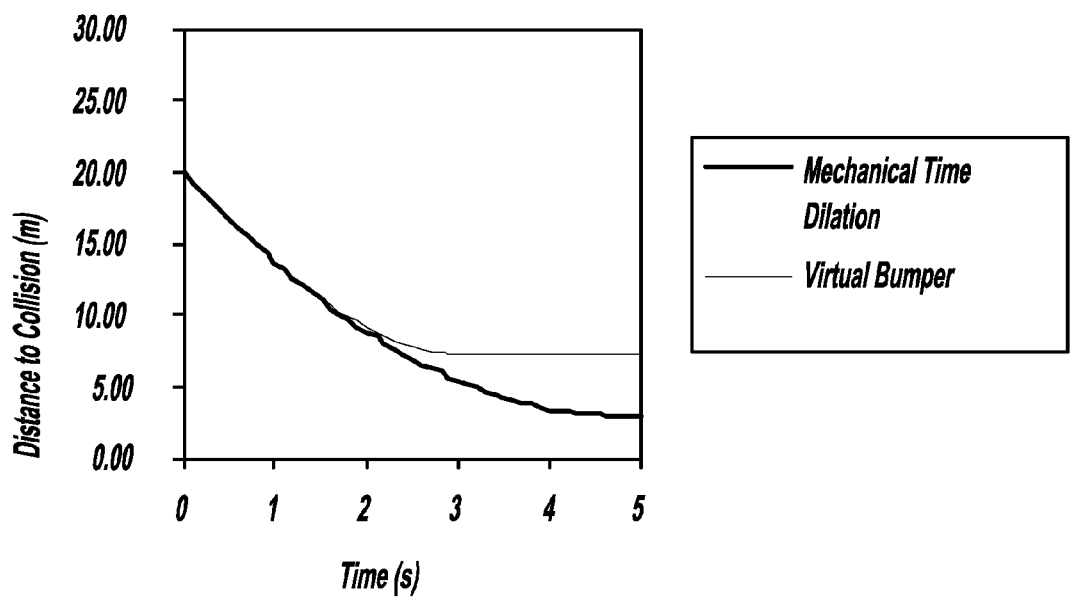
FIG. 6 is a graph with time on the horizontal axis and distance to collision on the vertical axis showing another exemplary comparison between the process for providing mechanical time dilation in response to a collision threat shown in FIG. 2 and a virtual bumper system that also employs a process for responding to a collision threat.
Figure 7:
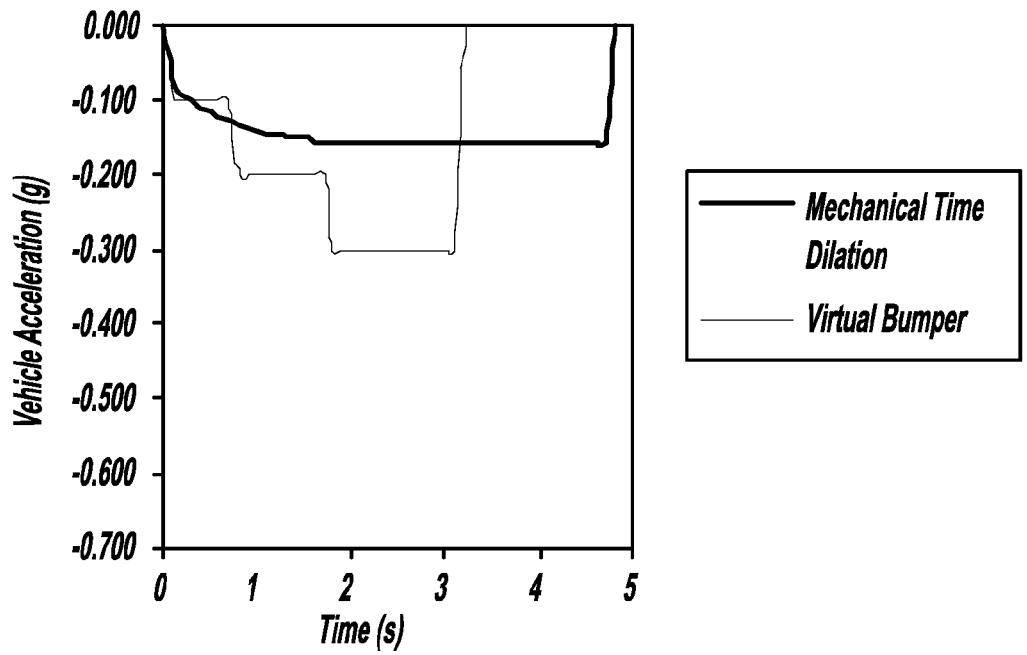
FIG. 7 is a graph with time on the horizontal axis and vehicle acceleration on the vertical axis showing another exemplary comparison between the process for providing mechanical time dilation in response to a collision threat shown in FIG. 2 and a virtual bumper system that also employs a process for responding to a collision threat.
Figure 8:
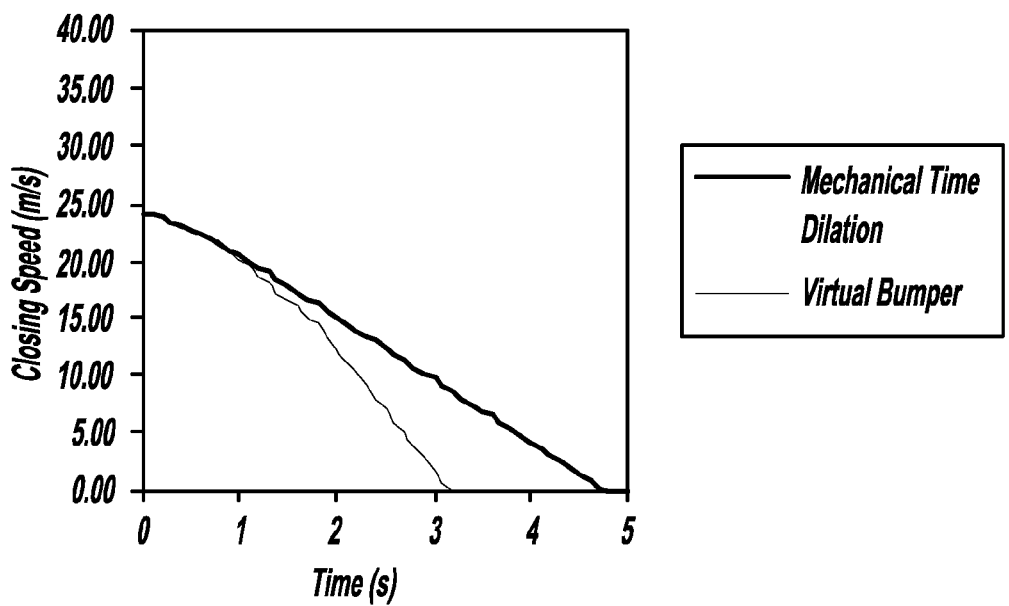
FIG. 8 is a graph with time on the horizontal axis and closing speed on the vertical axis showing another exemplary comparison between the process for providing mechanical time dilation in response to a collision threat shown in FIG. 2 and a virtual bumper system that also employs a process for responding to a collision threat.

FIGS. 6-8 are graphs showing another exemplary comparison between the process for providing mechanical time dilation in response to a collision threat shown by the flow chart diagram 20 and for a process known as virtual bumper that also responds to a collision threat. Particularly, FIG. 6 shows a comparison for distance to collision over time, FIG. 7 shows a comparison for vehicle acceleration over time and FIG. 8 shows a comparison between closing speed over time. In this example, the closing speed is 24 kph and the range is 20 m as initial conditions, where the mechanical time dilation strategy is to provide a freeze TTC at 3.0 seconds and a full stop range of 3 m. The mechanical time dilation results included a maximum acceleration of −0.15 g and a time to full stop of 4.8 seconds.

Figure 9:
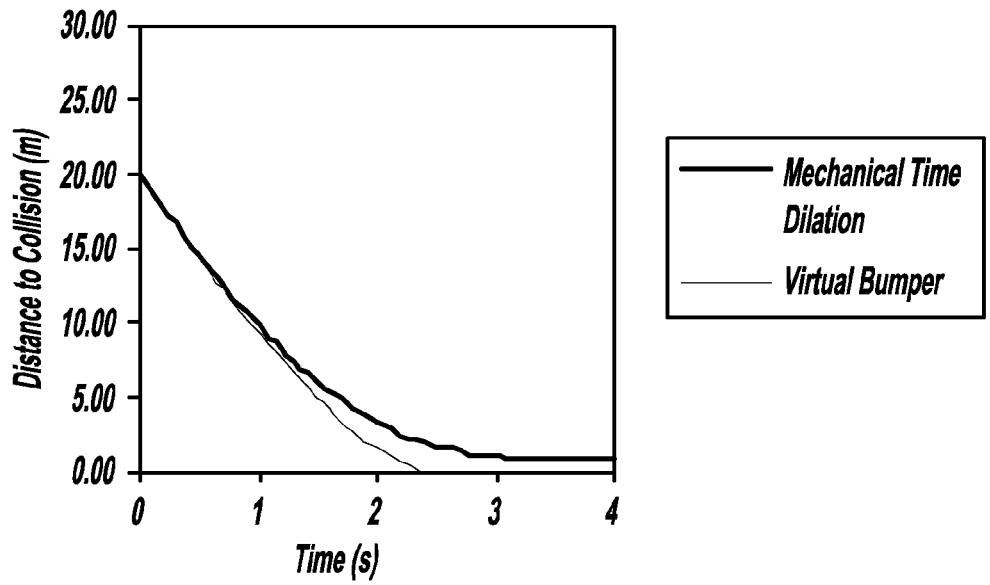
FIG. 9 is a graph with time on the horizontal axis and distance to collision on the vertical axis showing another exemplary comparison between the process for providing mechanical time dilation in response to a collision threat shown in FIG. 2 and a virtual bumper system that also employs a process for responding to a collision threat.
Figure 10:
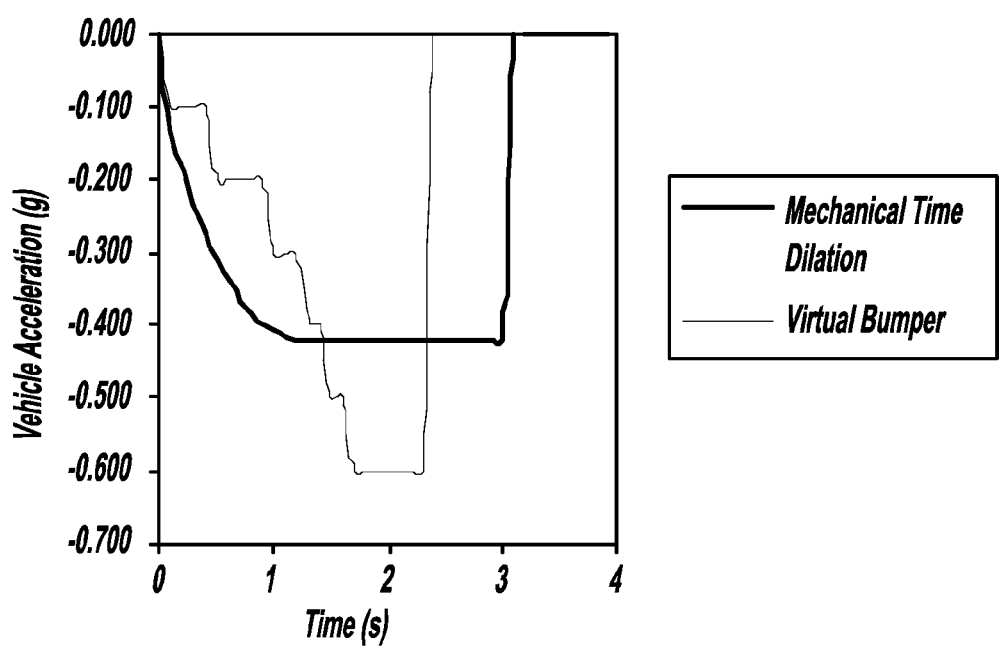
FIG. 10 is a graph with time on the horizontal axis and vehicle acceleration on the vertical axis showing another exemplary comparison between the process for providing mechanical time dilation in response to a collision threat shown in FIG. 2 and a virtual bumper system that also employs a process for responding to a collision threat.
Figure 11:
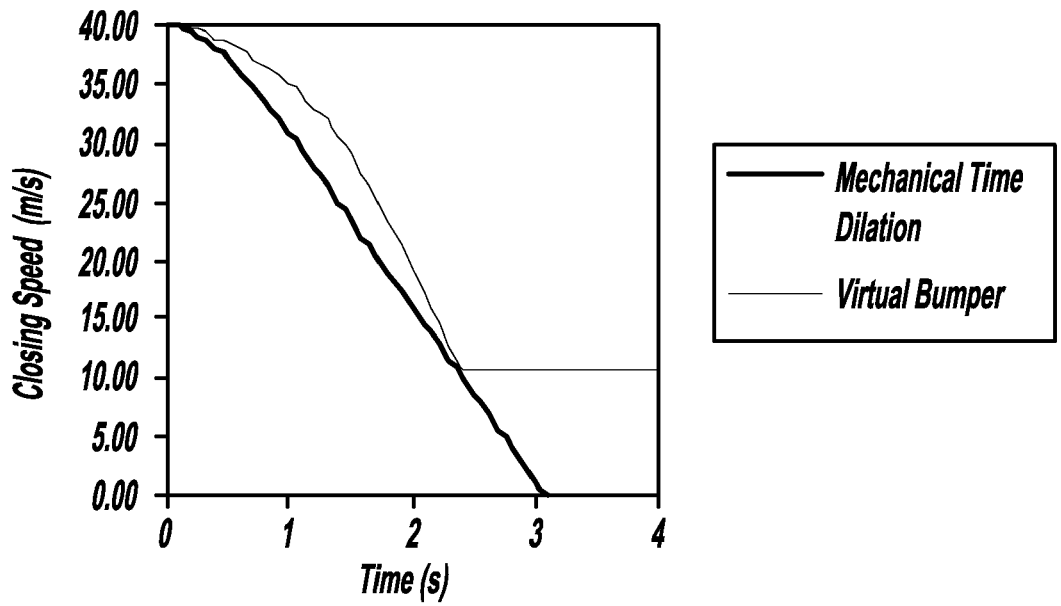
FIG. 11 is a graph with time on the horizontal axis and closing speed on the vertical axis showing another exemplary comparison between the process for providing mechanical time dilation in response to a collision threat shown in FIG. 2 and a virtual bumper system that also employs a process for responding to a collision threat.

FIGS. 9-11 are graphs showing another exemplary comparison between the process for providing mechanical time dilation in response to a collision threat shown by the flow chart diagram 20 and for a process known as virtual bumper that also responds to a collision threat. Particularly, FIG. 9 shows a comparison for distance to collision over time, FIG. 10 shows a comparison for vehicle acceleration over time and FIG. 11 shows a comparison between closing speed over time. In this example, the closing speed is 40 kph and the range is 20 m as initial conditions, where the mechanical time dilation strategy is to provide a freeze TTC at 1.8 seconds and a full stop range of 1 m. The mechanical time dilation results included a maximum acceleration of −0.42 g and a time to full stop of 3.1 seconds.

Figure 12:
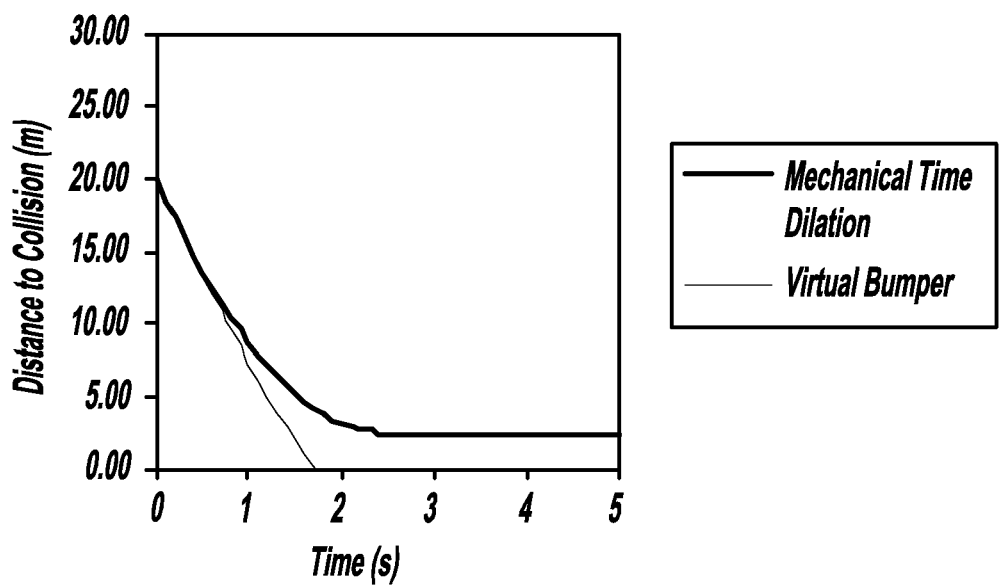
FIG. 12 is a graph with time on the horizontal axis and distance to collision on the vertical axis showing another exemplary comparison between the process for providing mechanical time dilation in response to a collision threat shown in FIG. 2 and a virtual bumper system that also employs a process for responding to a collision threat.
Figure 13:
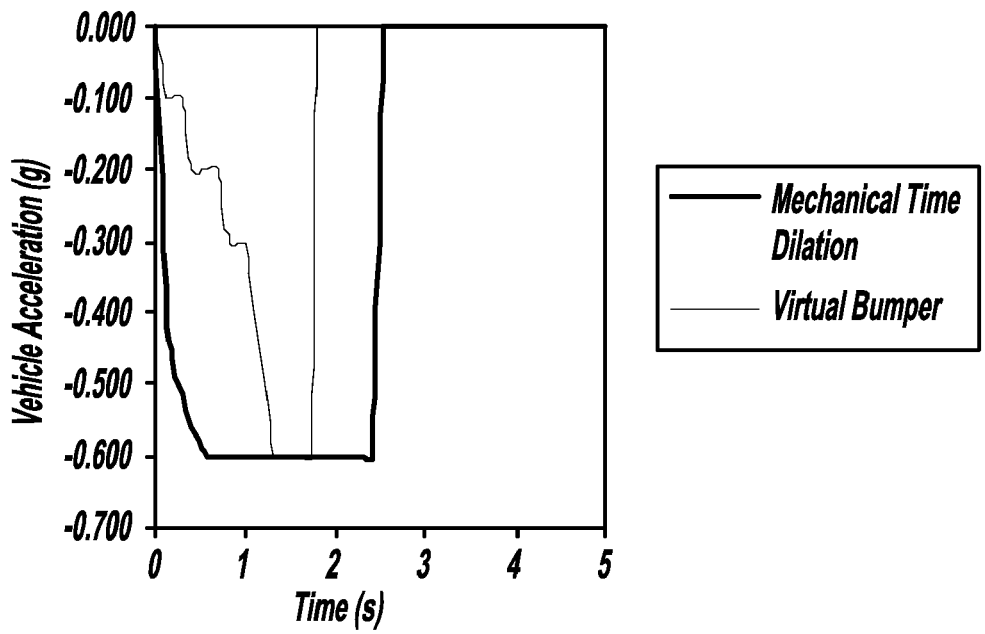
FIG. 13 is a graph with time on the horizontal axis and vehicle acceleration on the vertical axis showing another exemplary comparison between the process for providing mechanical time dilation in response to a collision threat shown in FIG. 2 and a virtual bumper system that also employs a process for responding to a collision threat.
Figure 14:
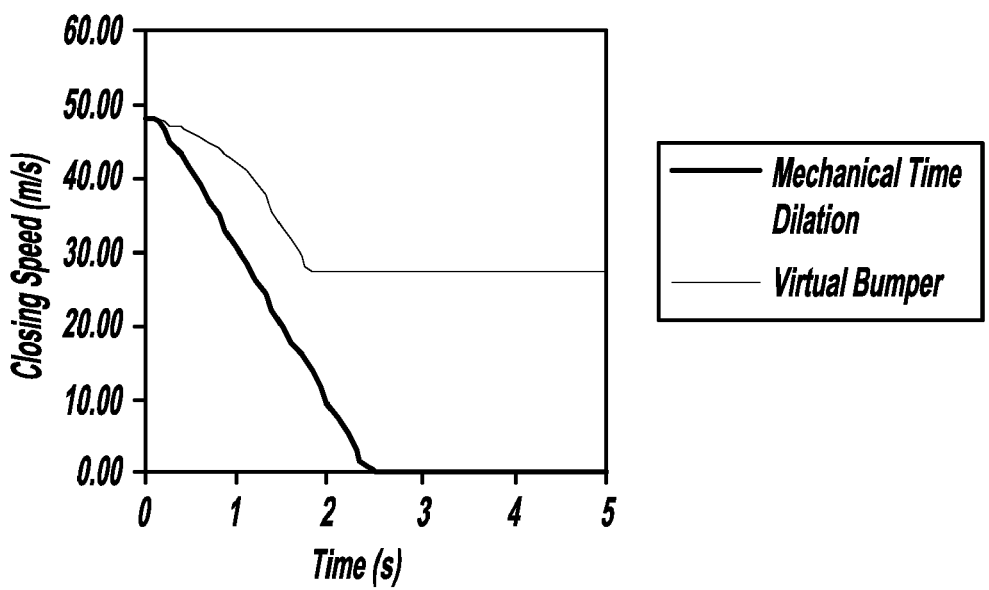
FIG. 14 is a graph with time on the horizontal axis and closing speed on the vertical axis showing another exemplary comparison between the process for providing mechanical time dilation in response to a collision threat shown in FIG. 2 and a virtual bumper system that also employs a process for responding to a collision threat.

FIGS. 12-14 are graphs showing another exemplary comparison between the process for providing mechanical time dilation in response to a collision threat shown by the flow chart diagram 20 and for a process known as virtual bumper that also responds to a collision threat. Particularly, FIG. 12 shows a comparison for distance to collision over time, FIG. 13 shows a comparison for vehicle acceleration over time and FIG. 14 shows a comparison between closing speed over time. In this example, the closing speed is 40 kph and the range is 20 m as initial conditions, where the mechanical time dilation strategy is to provide a freeze TTC at 1.5 seconds and a full stop range of 1 m. The mechanical time dilation results included a maximum acceleration of −0.6 g and a time to full stop of 2.5 seconds.

Figure 15:
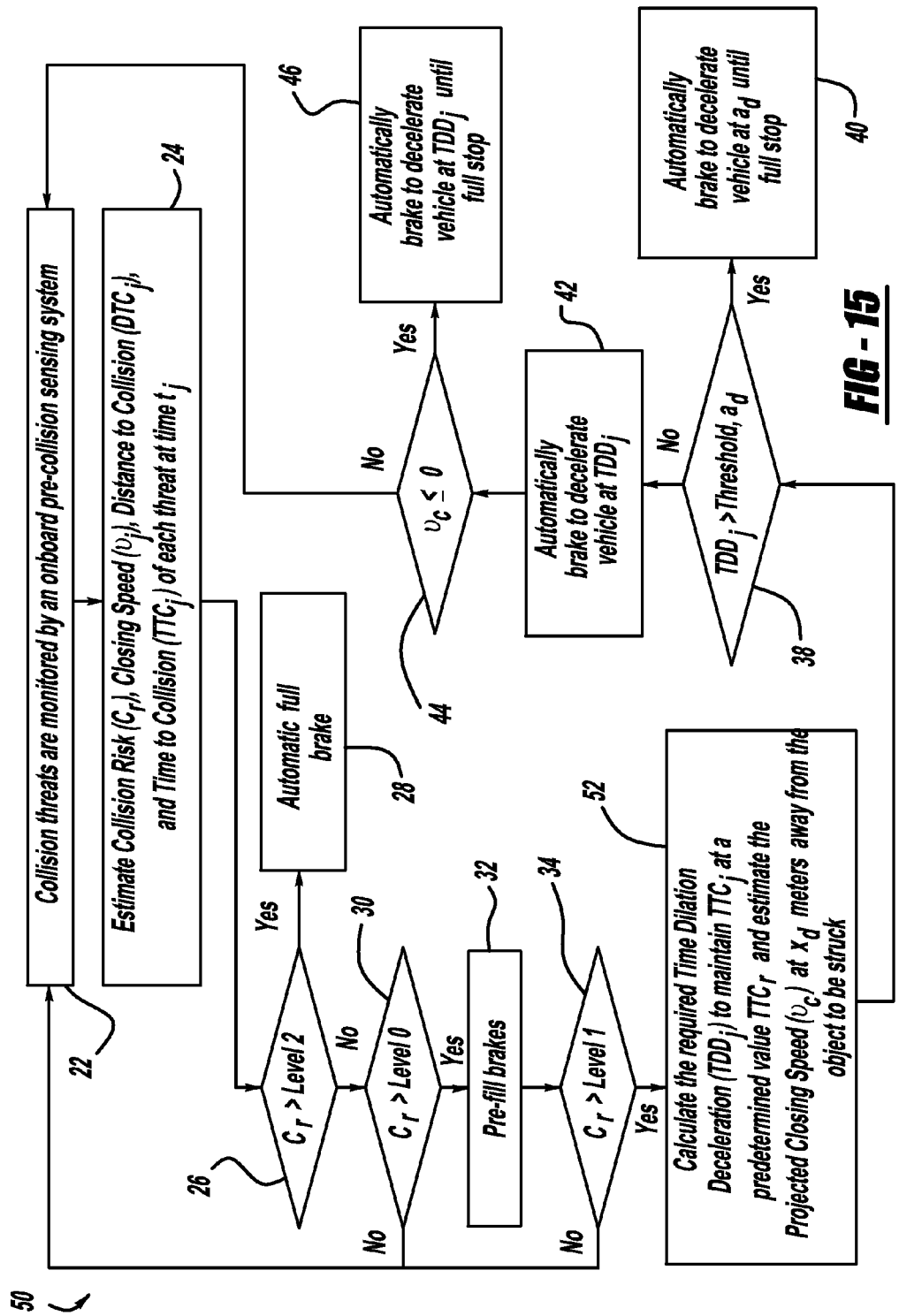
FIG. 15 is a flow chart diagram showing a process for providing mechanical time dilation through limited vehicle braking in the event that a collision threat is determined so as to provide more time to determine whether full automatic braking is required to avoid the collision, according to another embodiment of the present invention.

FIG. 15 is a flow chart diagram 50 showing a process for providing mechanical time dilation for an automatic braking system, according to another embodiment of the present invention. In this embodiment, both the time to point C TTC and the full stop range $x_d$ are given. The flow chart diagram 50 is similar to the flow chart diagram 20, where like reference numerals identify identical steps. In this embodiment, instead of maintaining the time to collision $TTC_j$ at its previous value at the box 36, the algorithm maintains the time to collision $TTC_j$ at a predetermined desirable time to collision $TTC_r$ at box 52. In other words, the algorithm determines what a desired time is until the vehicle 10 reaches point C instead of using the predicted time.

Figure 16:
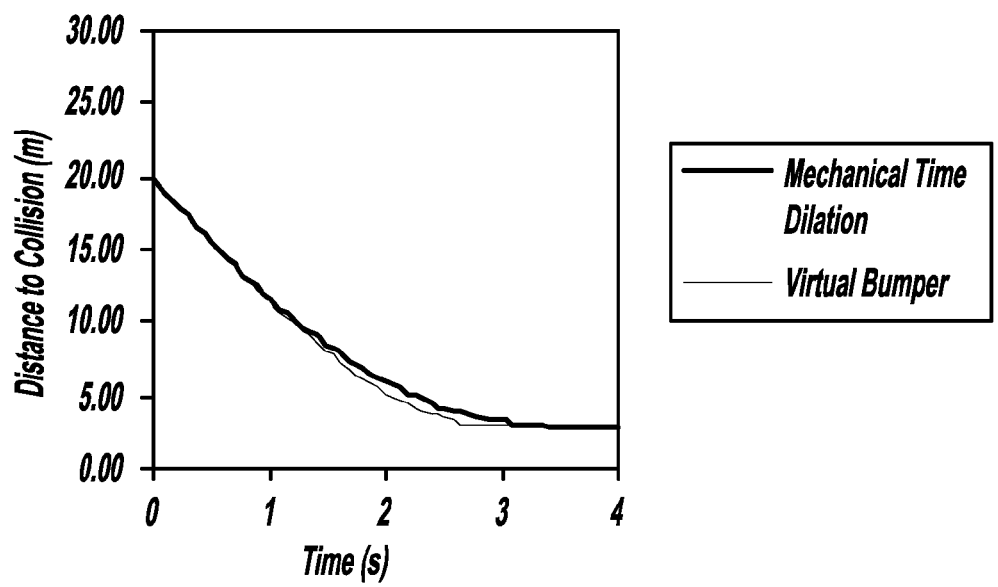
FIG. 16 is a graph with time on the horizontal axis and distance to collision on the vertical axis showing an exemplary comparison between the process for providing mechanical time dilation in response to a collision threat shown in FIG. 15 and a virtual bumper system that also employs a process for responding to a collision threat.
Figure 17:
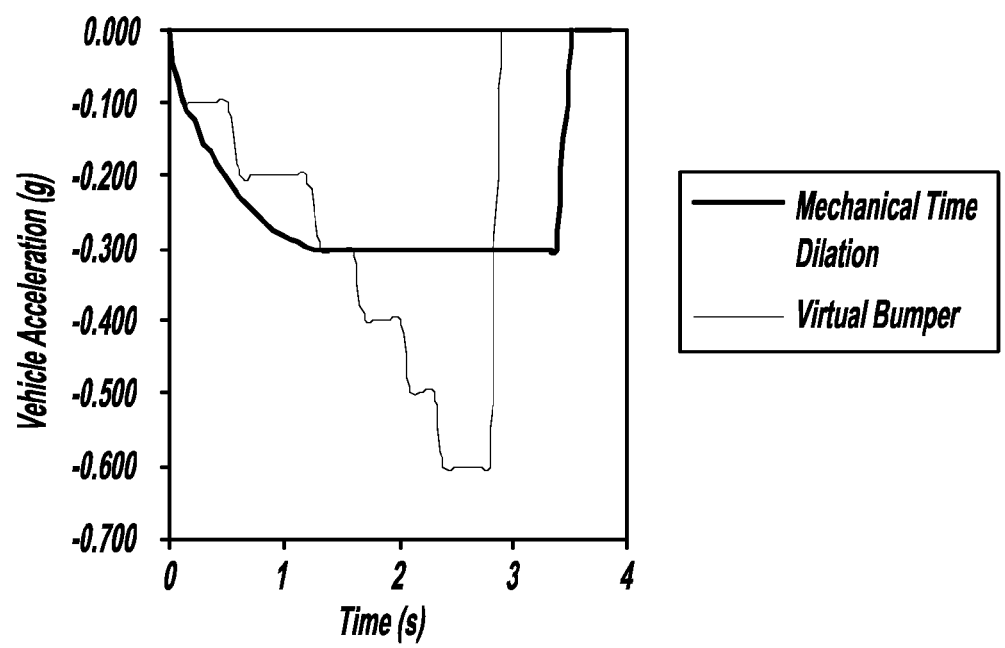
FIG. 17 is a graph with time on the horizontal axis and vehicle acceleration on the vertical axis showing an exemplary comparison between the process for providing mechanical time dilation in response to a collision threat shown in FIG. 15 and a virtual bumper system that also employs a process for responding to a collision threat.
Figure 18:
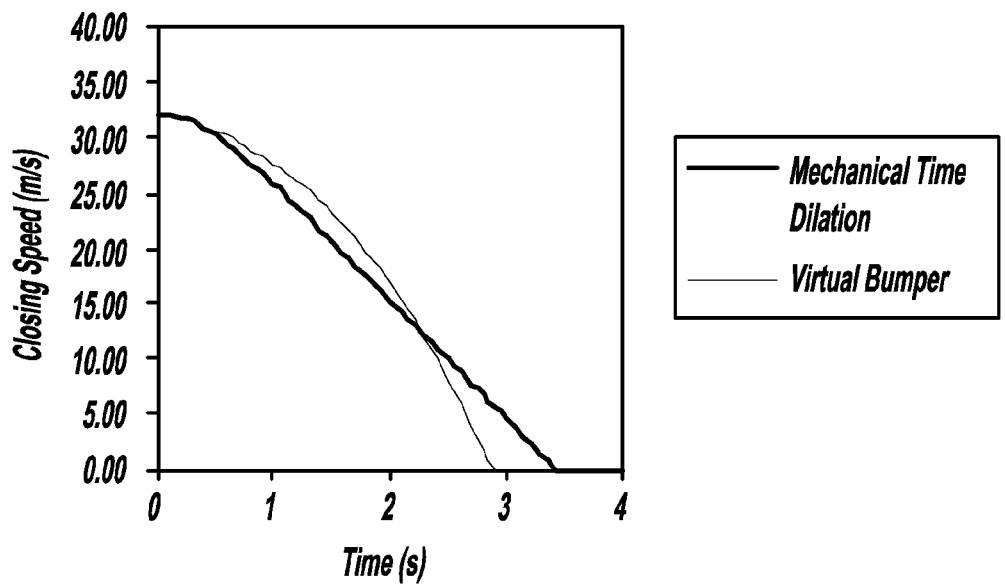
FIG. 18 is a graph with time on the horizontal axis and closing speed on the vertical axis showing an exemplary comparison between the process for providing mechanical time dilation in response to a collision threat shown in FIG. 15 and a virtual bumper system that also employs a process for responding to a collision threat.

FIGS. 16-18 are graphs showing an exemplary comparison between the process for providing mechanical time dilation in response to a collision threat shown by the flow chart diagram 50 and for a process known as virtual bumper that also responds to a collision threat. Particularly, FIG. 16 shows a comparison for distance to collision over time, FIG. 17 shows a comparison for vehicle acceleration over time and FIG. 18 shows a comparison between closing speed over time. In this example, the closing speed is 32 kph and the range is 20 m as initial conditions, where the mechanical time dilation strategy is to provide a freeze TTC at 2.0 seconds and a full stop range of 3 m. The mechanical time dilation results included a maximum acceleration of −0.3 g and a time to full stop of 3.5 seconds.

Figure 19:
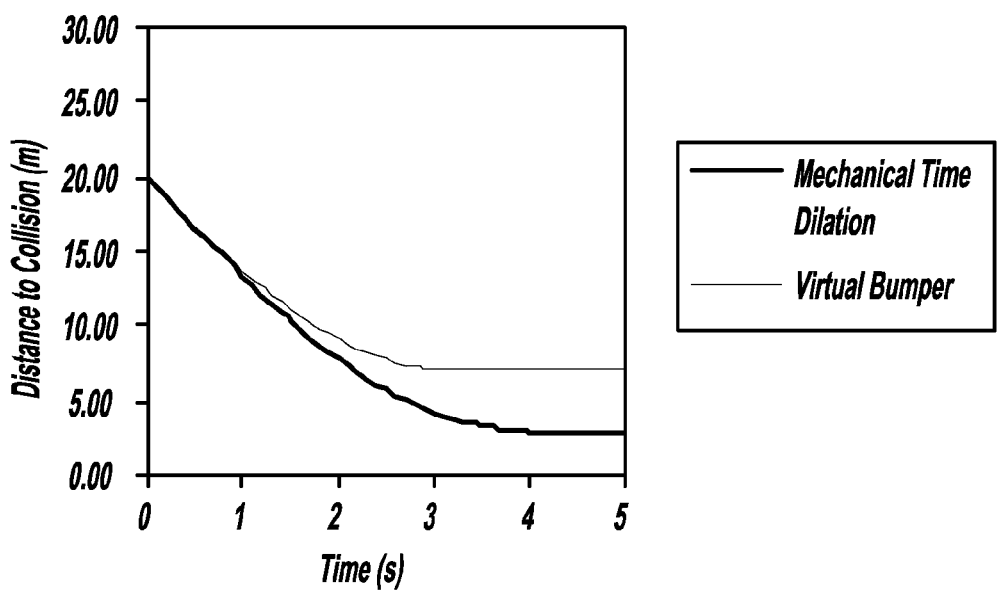
FIG. 19 is a graph with time on the horizontal axis and distance to collision on the vertical axis showing another exemplary comparison between the process for providing mechanical time dilation in response to a collision threat shown in FIG. 15 and a virtual bumper system that also employs a process for responding to a collision threat.
Figure 20:
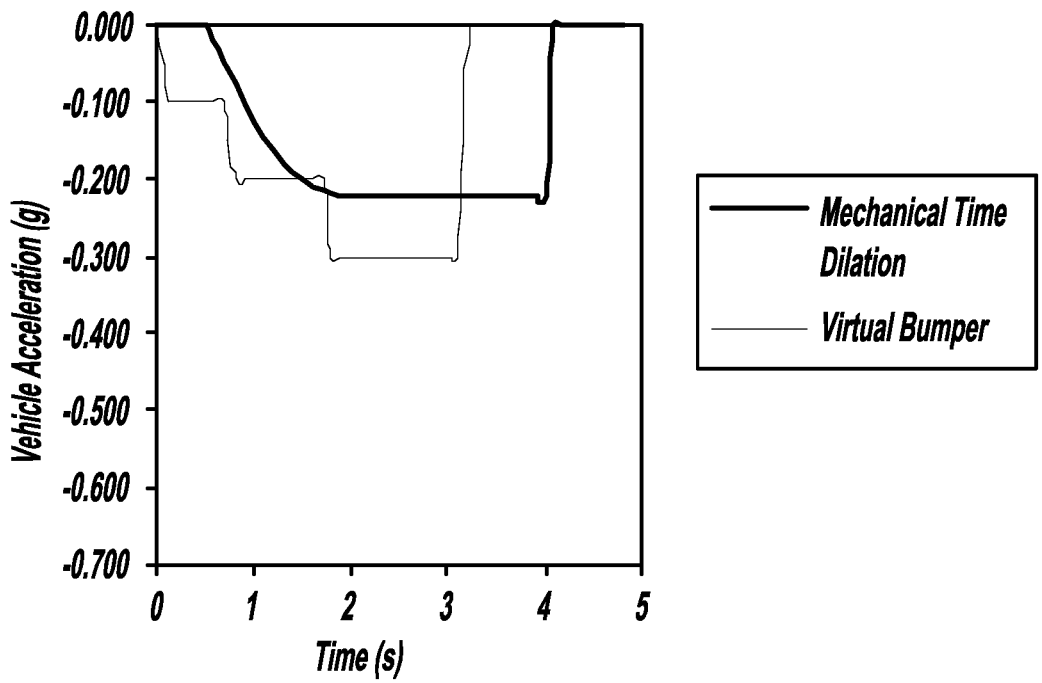
FIG. 20 is a graph with time on the horizontal axis and vehicle acceleration on the vertical axis showing another exemplary comparison between the process for providing mechanical time dilation in response to a collision threat shown in FIG. 15 and a virtual bumper system that also employs a process for responding to a collision threat.
Figure 21:
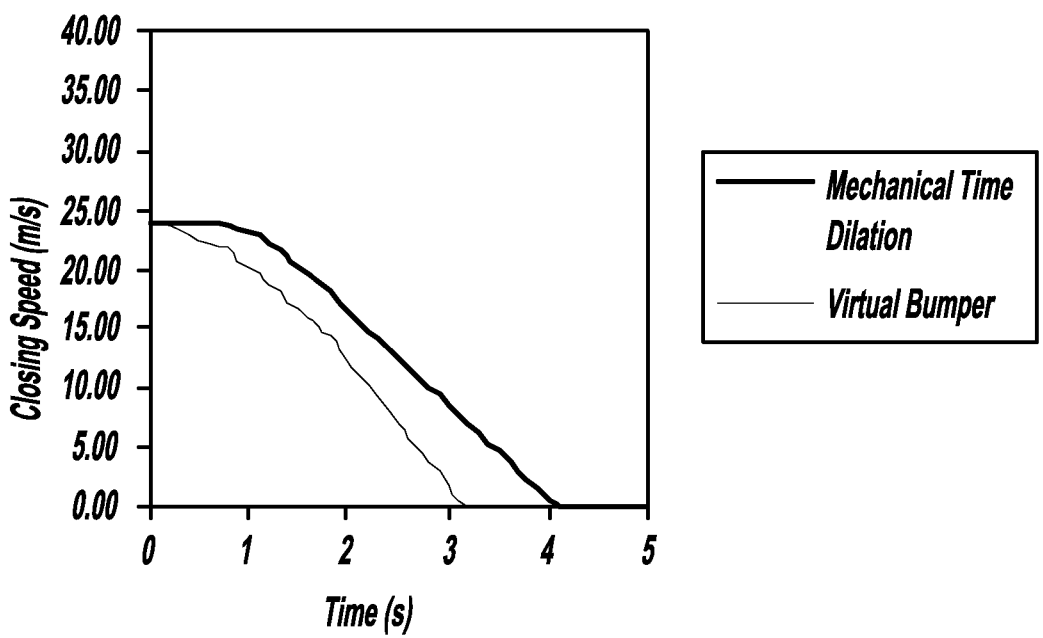
FIG. 21 is a graph with time on the horizontal axis and closing speed on the vertical axis showing another exemplary comparison between the process for providing mechanical time dilation in response to a collision threat shown in FIG. 15 and a virtual bumper system that also employs a process for responding to a collision threat.

FIGS. 19-21 are graphs showing another exemplary comparison between the process for providing mechanical time dilation in response to a collision threat shown by the flow chart diagram 50 and for a process known as virtual bumper that also responds to a collision threat. Particularly, FIG. 19 shows a comparison for distance to collision over time, FIG. 20 shows a comparison for vehicle acceleration over time and FIG. 21 shows a comparison between closing speed over time. In this example, the closing speed is 24 kph and the range is 20 m as initial conditions, where the mechanical time dilation strategy is to provide a freeze TTC at 2.0 seconds and a full stop range of 3 m. The mechanical time dilation results included a maximum acceleration of −0.23 g and a time to full stop of 4.1 seconds.

Figure 22:
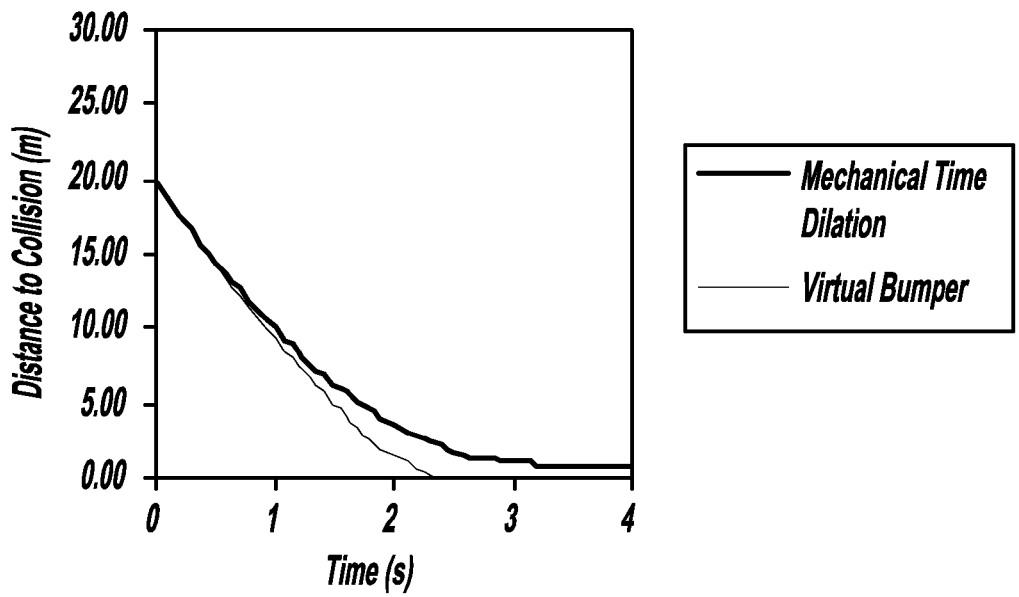
FIG. 22 is a graph with time on the horizontal axis and distance to collision on the vertical axis showing another exemplary comparison between the process for providing mechanical time dilation in response to a collision threat shown in FIG. 15 and a virtual bumper system that also employs a process for responding to a collision threat.
Figure 23:
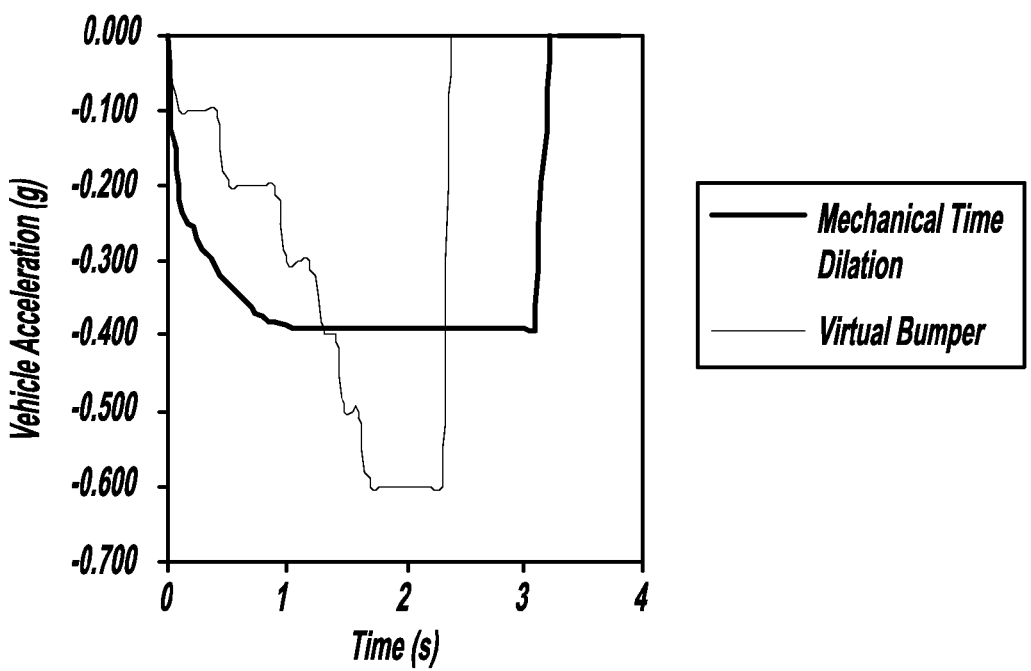
FIG. 23 is a graph with time on the horizontal axis and vehicle acceleration on the vertical axis showing another exemplary comparison between the process for providing mechanical time dilation in response to a collision threat shown in FIG. 15 and a virtual bumper system that also employs a process for responding to a collision threat.
Figure 24:
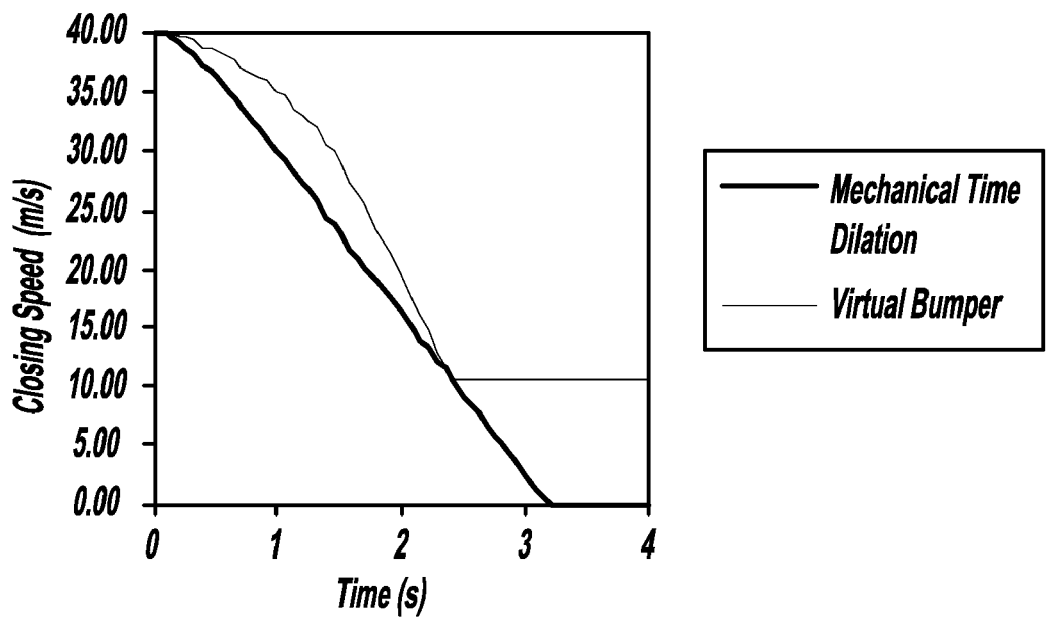
FIG. 24 is a graph with time on the horizontal axis and closing speed on the vertical axis showing another exemplary comparison between the process for providing mechanical time dilation in response to a collision threat shown in FIG. 15 and a virtual bumper system that also employs a process for responding to a collision threat.

FIGS. 22-24 are graphs showing another exemplary comparison between the process for providing mechanical time dilation in response to a collision threat shown by the flow chart diagram 50 and for a process known as virtual bumper that also responds to a collision threat. Particularly, FIG. 22 shows a comparison for distance to collision over time, FIG. 23 shows a comparison for vehicle acceleration over time and FIG. 24 shows a comparison between closing speed over time. In this example, the closing speed is 40 kph and the range is 20 m as initial conditions, where the mechanical time dilation strategy is to provide a freeze TTC at 2.0 seconds and a full stop range of 1 m. The mechanical time dilation results included a maximum acceleration of −0.39 g and a time to full stop of 3.2 seconds.

Figure 25:
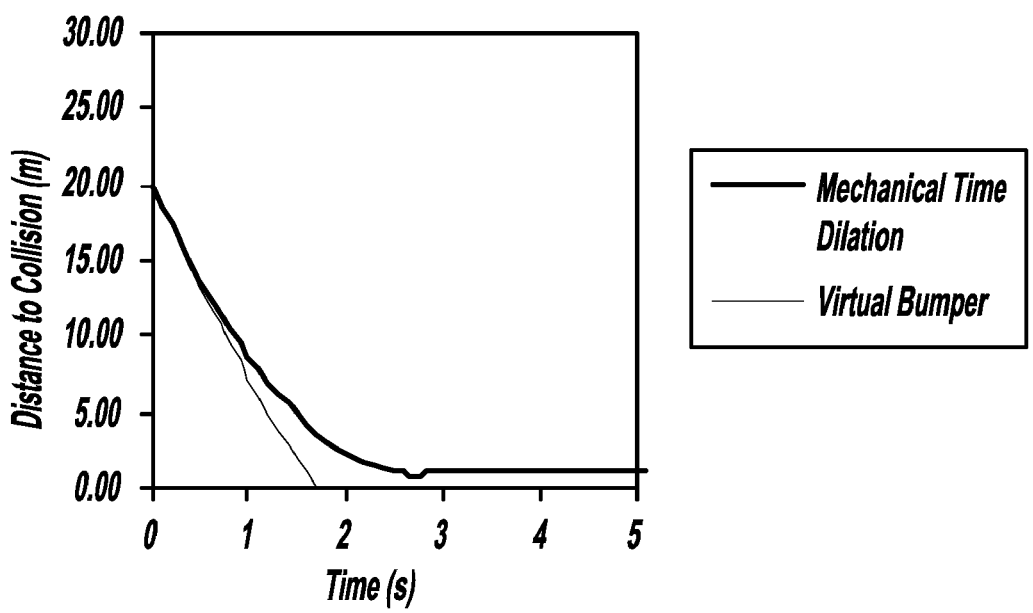
FIG. 25 is a graph with time on the horizontal axis and distance to collision on the vertical axis showing another exemplary comparison between the process for providing mechanical time dilation in response to a collision threat shown in FIG. 15 and a virtual bumper system that also employs a process for responding to a collision threat.
Figure 26:
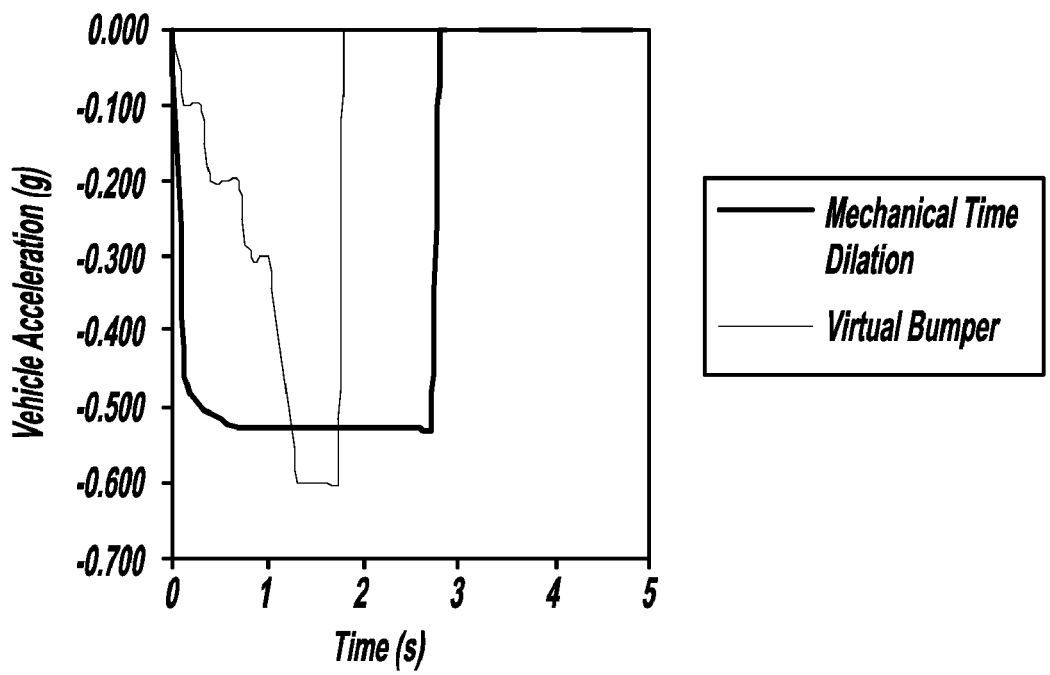
FIG. 26 is a graph with time on the horizontal axis and vehicle acceleration on the vertical axis showing another exemplary comparison between the process for providing mechanical time dilation in response to a collision threat shown in FIG. 15 and a virtual bumper system that also employs a process for responding to a collision threat.
Figure 27:
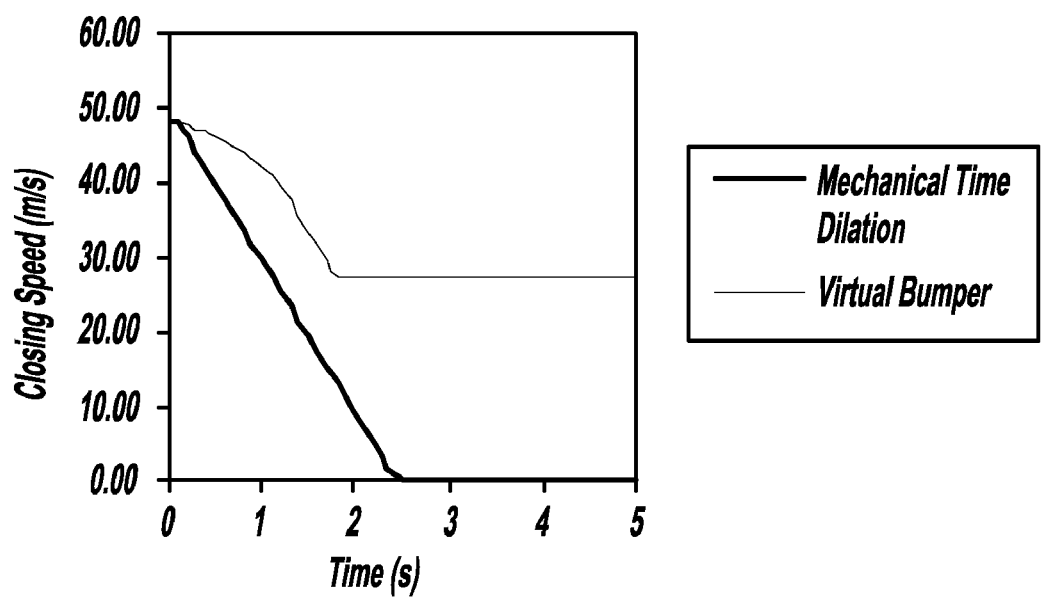
FIG. 27 is a graph with time on the horizontal axis and closing speed on the vertical axis showing another exemplary comparison between the process for providing mechanical time dilation in response to a collision threat shown in FIG. 15 and virtual bumper that is also a process for responding to a collision threat.

FIGS. 25-27 are graphs showing another exemplary comparison between the process for providing mechanical time dilation in response to a collision threat shown by the flow chart diagram 50 and for a process known as virtual bumper that also responds to a collision threat. Particularly, FIG. 25 shows a comparison for distance to collision over time, FIG. 26 shows a comparison for vehicle acceleration over time and FIG. 27 shows a comparison between closing speed over time. In this example, the closing speed is 48 kph and the range is 20 m as initial conditions, where the mechanical time dilation strategy is to provide a freeze TTC at 2.0 seconds and a full stop range of 1 m. The mechanical time dilation results included a maximum acceleration of −0.52 g and a time to full stop of 2.8 seconds.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing limited braking for an automatic vehicle braking system to prevent a collision, said method comprising:

monitoring collision threats on a subject vehicle;
estimating a collision risk value between the subject vehicle and an object;
calculating a closing speed between the subject vehicle and the object;
calculating a distance to collision between the subject vehicle and the object;
calculating a time to collision between the subject vehicle and the object;
determining whether the collision risk value is greater than a first predetermined threshold;
providing full automatic braking of the subject vehicle if the collision risk value is greater than the first predetermined threshold;

determining whether the collision risk value is greater than a second predetermined threshold if the collision risk value is less than the first predetermined threshold;

determining whether the collision risk value is greater than a third predetermined threshold if the collision risk value is greater than the second predetermined threshold, where the third predetermined threshold is between the first and second predetermined thresholds;

calculating a time dilation deceleration value;

estimating a projected closing speed of the subject vehicle to the object;

determining whether the time dilation deceleration value is greater than a predetermined deceleration threshold;

providing automatic braking to decelerate the vehicle to a full stop if the time dilation deceleration value is greater than the deceleration threshold; and automatically braking the subject vehicle to decelerate the subject vehicle at the time dilation deceleration value if the time dilation deceleration value is not greater than the deceleration threshold.

2. The method according to claim 1 wherein calculating the time dilation deceleration value includes calculating the time dilation deceleration value to maintain a time to collision at a predetermined time.

3. The method according to claim 1 wherein calculating the time dilating deceleration value includes maintaining a time to collision at a previous time.

4. The method according to claim 1 further comprising determining whether the closing speed is less than or equal to zero after the vehicle is automatically braking at the time dilation deceleration value and, if so, automatically braking the subject vehicle to a full stop at the time dilation deceleration value.

5. The method according to claim 1 wherein calculating a time dilation deceleration value includes using the equation:

$$TDD_j = \frac{2[(DTC_j - x_d) - v_j(TTC_d)]}{(TTC_d)^2}$$

where $TTC_d$ is a time to collision with the object, $v_j$ is the closing speed of the subject vehicle to the object, $DTC_j$ is the distance to collision with the object and $x_d$ is a safety margin distance required from the object for full stop to prevent a collision.

6. A method for providing limited braking for an automatic vehicle braking system to prevent a collision, said method comprising:

monitoring collision threats on a subject vehicle;

calculating a time dilating deceleration value to prevent the subject vehicle from colliding with an object;

estimating a projected closing speed of the subject vehicle to the object;

determining whether the time dilation deceleration value is greater than a predetermined deceleration threshold;

automatically braking the subject vehicle to decelerate the subject vehicle at a predetermined braking threshold if the time dilation deceleration value is greater than the deceleration threshold; and automatically braking the subject vehicle to decelerate the subject vehicle at the time dilation deceleration value if the time dilation deceleration value is not greater than the deceleration threshold.

7. The method according to claim 6 wherein calculating the time dilation deceleration value includes calculating the time dilation deceleration value to maintain a time to collision at a predetermined time.

8. The method according to claim 6 wherein calculating the time dilating deceleration value includes maintaining a time to collision at a previous time.

9. The method according to claim 6 further comprising estimating a projected closing speed of the subject vehicle to the object.

10. The method according to claim 9 further comprising determining whether the projected closing speed is less than or equal to zero after the vehicle is automatically braked at the time dilation deceleration value and, if so, automatically braking the subject vehicle to a full stop at the time dilation deceleration value.

11. The method according to claim 6 wherein calculating a time dilation deceleration value includes using the equation:

$$TDD_j = \frac{2[(DTC_j - x_d) - v_j(TTC_d)]}{(TTC_d)^2}$$

where $TTC_d$ is a time to collision with the object, $V_j$ is the closing speed of the subject vehicle to the object, $DTC_j$ is the distance to collision with the object and $x_d$ is a safety margin distance required from the object for full stop to prevent a collision.

12. The method according to claim 6 further comprising estimating a collision risk value between the subject vehicle and the object, determining whether the collision risk value is greater than a predetermined threshold and providing full automatic braking of the subject vehicle if the collision risk value is greater than the predetermined threshold.

13. The method according to claim 12 further comprising determining whether the collision risk value is greater than a second predetermined threshold if the collision risk value is less than the first predetermined threshold and performing predetermined pre-collision functions if the collision risk value is greater than the second predetermined threshold.

14. An automatic vehicle braking system for providing limited braking, said system comprising:

means for monitoring collision threats on a subject vehicle;

means for estimating a collision risk value between the subject vehicle and an object;

means for calculating a closing speed between the subject vehicle and the object;

means for calculating a distance to collision between the subject vehicle and the object;

means for calculating a time to collision between the subject vehicle and the object;

means for determining whether the collision risk value is greater than a first predetermined threshold;

means for providing full automatic braking of the subject vehicle if the collision risk value is greater than the first predetermined threshold;

means for determining whether the collision risk value is greater than a second predetermined threshold if the collision risk value is less than the first predetermined threshold;

means for determining whether the collision risk value is greater than a third predetermined threshold if the collision risk value is greater than the second predetermined threshold, or the third predetermined threshold is between the first and second predetermined thresholds;

means for calculating a time dilation deceleration value;

means for estimating a projected closing speed of the subject vehicle to the object;

means for determining whether the time dilation deceleration value is greater than a predetermined deceleration threshold;

means for providing automatic braking to decelerate the vehicle to a full stop if the time dilation deceleration value is greater than the deceleration threshold; and means for automatically braking the subject vehicle to decelerate the subject vehicle at the time dilation deceleration value if the time dilation deceleration value is not greater than the deceleration threshold.

15. The system according to claim 14 wherein the means for calculating the time dilation deceleration value calculates the time dilation deceleration value to maintain a time to collision at a predetermined value.

16. The system according to claim 14 wherein the means for calculating the time dilating deceleration value maintains a time to collision at a previous value.

17. The system according to claim 14 further comprising means for determining whether the closing speed is less than or equal to zero after the vehicle is automatically braking at the time dilation deceleration value and, if so, automatically braking the subject vehicle to a full stop at the time dilation deceleration value.

18. The system according to claim 14 wherein the means for calculating a time dilation deceleration value uses the equation:

$$TDD_j = \frac{2[(DTC_j - x_d) - v_j(TTC_d)]}{(TTC_d)^2}$$

where $TTC_d$ is a time to collision with the object, $v_j$ is the closing speed of the subject vehicle to the object, $DTC_j$ is the distance to collision with the object and $x_d$ is a safety margin distance required from the object for full stop to prevent a collision.

* * * * *